Feb. 13, 1962 K. BINDER ET AL 3,020,761
FUEL CONSUMPTION METER
Filed Oct. 10, 1958 4 Sheets-Sheet 1

INVENTORS
KARL BINDER
CHRISTIAN WALDEMAR HOLM
BY Dicke and Craig
ATTORNEYS

Feb. 13, 1962 K. BINDER ET AL 3,020,761
FUEL CONSUMPTION METER
Filed Oct. 10, 1958 4 Sheets-Sheet 2

INVENTORS
KARL BINDER
CHRISTIAN WALDEMAR HOLM
BY Dicke and Craig
ATTORNEYS

Feb. 13, 1962 K. BINDER ET AL 3,020,761
FUEL CONSUMPTION METER
Filed Oct. 10, 1958 4 Sheets-Sheet 4

INVENTORS
KARL BINDER
CHRISTIAN WALDEMAR HOLM
BY Dicke and Craig
ATTORNEYS

United States Patent Office 3,020,761
Patented Feb. 13, 1962

3,020,761
FUEL CONSUMPTION METER
Karl Binder, Stuttgart, Germany, and Christian W. Holm, deceased, late of Stuttgart-Moehringen, Germany, by Astrid Holm, sole heir, Stuttgart-Moehringen, Germany, assignors to Wurttemberg Gaszahlerfabrik J. Braun & Co., G.m.b.H., Stuttgart, Germany
Filed Oct. 10, 1958, Ser. No. 859,427
18 Claims. (Cl. 73—270)

The present invention relates to a flow meter for measuring the consumption of flowing liquids, particularly fuel oil or other liquid fuels. More particularly, the invention relates to such a flow meter which measures the volume of the flowing medium and operates according to the two-chamber principle by being provided with a flexible partition, for example, a diaphragm or a piston, wherein the reciprocating strokes of the diaphragm or piston act by suitable transmission means upon a counter mechanism which indicates and/or records the amount of liquid consumed.

The liquid-consumption meters known prior to this invention did not permit an accurate measuring of small quantities of liquids, for example, oil, particularly when under a low pressure, for example, in quarts or liters per hour. Furthermore, these known meters were of a rather complicated construction, and it was difficult to seal the movable parts thereof.

It is an object of the present invention to overcome these disadvantages of the prior meters of this type. Essentially, the invention consists in mounting the entire control mechanism, including the counter drive, at the inside of the measuring chamber of the instrument which is filled with oil. Such arrangement has the advantage that it does not require any passages for movable parts within the instrument housing which have to be sealed. The instrument is preferably designed so that the diaphragm or other adjustable member which separates the two chambers of the instrument will adjust the position of a slide valve which is disposed within one of the chambers and is adapted to reverse the direction of flow into and from the two chambers.

For changing the direction of the oil flow toward one or the other chamber of the measuring instrument, the slide valve, which is preferably made in the form of a flat or gate-type slide valve, may be provided, for example, with two bores or channels and two slot-shaped recesses which are adapted to cooperate with three flow channels, one of which leads to the inlet conduit and the second to the outlet conduit of the liquid, while the third channel forms a by-pass which connects one of the chambers of the instrument through the slot-shaped recesses in the flat slide valve at first with the inlet conduit and then with the outlet conduit. The slide valve is preferably designed so as to be pivotable about an axis.

Another feature of the invention consists in providing the movable partition, for example, the diaphragm, with a system of levers which is adapted to adjust the slide valve and at the end of the stroke of the diaphragm to carry out a sudden control movement which is transmitted to the slide valve. This system of levers preferably operates on the principle of rocking about a dead-center position. The entire control mechanism may be assembled outside of the instrument housing and be inserted therein as a complete unit and mounted by means of a few screws.

A further feature of the invention which is designed to facilitate the construction of such measuring instruments and to render the same inexpensive so as to permit them to be mass-produced consists in the fact that the conduit which leads from the control mechanism within one measuring chamber to the other measuring chamber, and which effects the supply of the liquid to be measured to and the discharge from this measuring chamber, passes through the diaphragm or piston or is secured at one end thereof to the diaphragm or piston. Aside from other advantages, this type of construction permits a very considerable reduction of the wall strength of a consumption meter since the inlet to and the outlet from one measuring chamber no longer has to be by-passed around the diaphragm or piston through bores in the housing which for this purpose had to be previously made of a considerable thickness.

The ratchet wheel of the counter mechanism with which the pawls of the new meter engage is preferably mounted on the measuring unit which may be inserted into the housing of the instrument and may then be positively connected to the counter mechanism. This permits the pawls, which convert a reciprocating movement of the meter parts into a rotary movement of the ratchet wheel, to be accurately adjusted and inspected prior to the installation of the measuring unit, so that the difficulty of carrying out such adjustment within the confined space of the measuring chamber may be entirely avoided.

Further objects, features, and advantages of the present invention will become apparent from the following detailed description thereof, particularly when read with reference to the accompanying drawings, in which—

FIGURE 13 shows a longitudinal section of a measuring instrument according to another modification of the invention; while

Figure 1:
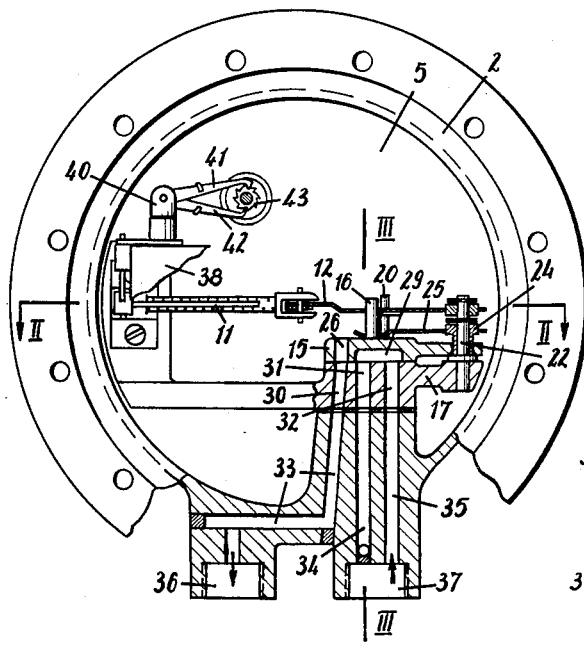
FIGURE 1 shows a front view of one chamber of the new instrument, partly in cross section taken through the three conduits which are combined into a block and through the slide valve plate and the pivotable slide valve member.
Figure 3:
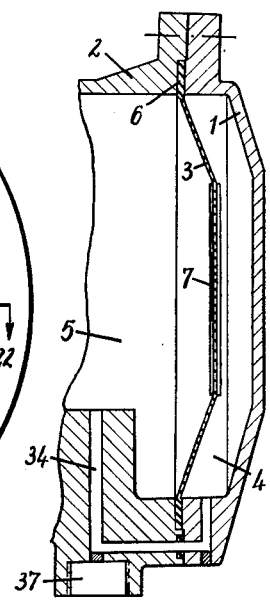
FIGURE 3 shows a cross section taken along line III—III of FIGURE 1, but omitting the movable parts.

Referring to the drawings, and first particularly to FIGURES 1 to 6, a diaphragm 3 is mounted between the housing parts 1 and 2 and thus forms two chambers 4 and 5 which may be called measuring chambers. Near its peripheral edge, diaphragm 3 is provided with a thicker reinforced portion 6 which may be clamped between housing parts 1 and 2 so as to seal the two measuring chambers 4 and 5 relative to each other.

Diaphragm 3 may be acted upon alternately at one side or the other by the liquid to be measured before such liquid continues to flow to the place of consumption. Diaphragm 3 has secured to its central part a plate 7 on which a bracket 8 is mounted within chamber 5. This bracket 8 pivotably supports a lever 10 which is provided with loop-shaped guide member 9 in which the pivotably interconnected inner ends of two levers 11 and 12 are slidably mounted which, in turn, are pivotably mounted at their outer ends on stationary shafts 40 and 22, respectively. Lever 11 consists of two coaxial rods which are adapted to telescope within each other and normally to be extended relative to each other by a compression spring 13. Lever 12 has a slot 14 which serves as a drag link for taking along a flat slide valve member 15. As illustrated particularly in FIGURE 1, valve member 15, when installed, is disposed within a horizontal plane so as to press downwardly by its own weight. It rests on a platelike valve member 17 which is made as a separate element and is mounted on the housing part 2 by means of a pair of bolts which are screwed into threaded holes 18 and 19 in member 17. In the embodiment according to FIGURE 1, valve member 17 forms a base for mounting the entire control mechanism thereon. The pivotal movement of valve member 15 is limited by lateral stop pins 20 which are mounted in valve member 17. Lever 12 has lateral projections 21 which also are adapted to engage against stop pins 20. The individual parts of this embodiment of the invention are made of such relative dimensions that lever 12 will always engage with one of the stop pins 20 before valve member 17 will do so. Consequently, when lever 12 or valve member 17 is in one of its end positions, valve member 17 will be relieved of the load of the lever system 11, 12. FIGURE 2 shows a narrow gap between pin 16 and the upper inner edge of slot 14. This gap may also be made slightly wider so that rocking lever 12 and spring lever 11 which are pivotally connected to each other will pivot not only at the angles which correspond to those of the movement of valve member 15, but also at an additional angle, with the result that, when lever 12 has passed beyond the central or dead-center position, it will by the action of spring 13 carry out an idle stroke and then suddenly throw valve member 15 toward the opposite end position by hitting against pin 16. Lever 12 will thus impart to pin 16 an acceleration which would not occur if the additional distance of travel would not exist. The point of time of the reversal of the valve mechanism will therefore be practically constant at all times.

Figure 6:
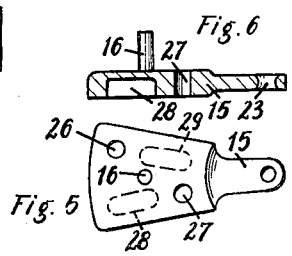
FIGURE 6 shows a longitudinal section of the pivotable valve member.

Valve plate 17 carries the valve shaft 22 on which a cylindrical bushing 24 is rotatably mounted which, in turn, passes through bore 23 in valve member 15. The upper end of bushing 24 has a larger diameter on which a leaf spring 25 is secured, the free end of which presses upon valve member 15. To render such pressure more effective, bore 23 is preferably rounded, as shown in FIGURE 6. In order to facilitate the installation of spring 25, its free end is preferably provided with a slot which permits the spring to be slipped over pin 16 on valve member 15.

Figure 5:
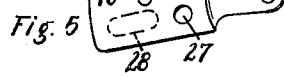
FIGURE 5 shows a plan view of the pivotable slide valve member.

As illustrated particularly in FIGURES 5 and 6, valve member 15 has two bores 26 and 27, as well as two elongated recesses 28 and 29 at its lower side. These bores and recesses serve for changing the supply and discharge flow of the liquid into and from one measuring chamber or the other 4 or 5.

Valve plate 17 is provided with three bores 30, 31, and 32 which are disposed so as to coincide with the inlet and outlet channels 33, 34, and 35 which are combined within an inner projection of housing part 2. Channel 33 is connected to a socket 36 into which the outlet pipe may be screwed, while channel 35 is connected to a socket 37 into which the inlet pipe for the liquid may be screwed. Channel 34 is an additional by-pass to permit the inflow and outflow of liquid toward or from measuring chamber 4.

Bracket 8 also pivotably supports an arm 38 at one end thereof. The other end of this arm is connected to a bracket 39 and thus forms an angular pivotable lever. Bracket 39 forms a bearing for a shaft 40 on which, in turn, a pulling pawl 41 and a pushing pawl 42 are rotatably mounted so as to act through a ratchet wheel 43 directly upon the drive shaft of the counter mechanism, which, however, may also be provided with a set of gear wheels which may be interposed between ratchet wheel 43 and the actual drive shaft of such mechanism.

Figure 2:
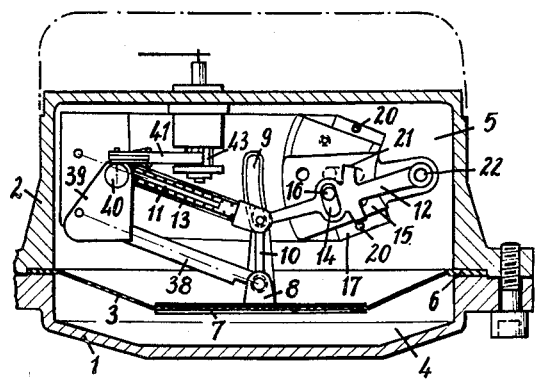
FIGURE 2 shows a cross section taken along line II—II of FIGURE 1.
Figure 4:
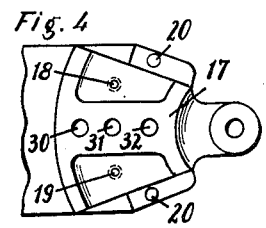
FIGURE 4 shows a plan view of the slide valve plate.

The operation of the instrument is as follows:

If the entire control mechanism is in the position as illustrated in FIGURES 1 and 2, rocking levers 11, 12 have just reversed the position of valve member 15 so that the liquid to be measured will now be discharged from the measuring chamber 5 through bore 26 in valve member 15, bore 30 in valve plate 17, and channel 33. At the same time, the liquid flows from bore 37 through channel 35, bore 32, the elongated recess 29, and by-pass 34 into measuring chamber 4. The liquid which thus flows into one measuring chamber and out of the other chamber then pushes diaphragm 3 gradually toward chamber 5, whereby lever 10 takes along the levers 11 and 12 until these levers will be in a straight position relative to each other. During this pivotal movement of levers 11 and 12, spring 13 has been increasingly compressed, while valve member 15 has remained at rest. As soon as diaphragm 3 is then moved slightly further toward chamber 5, levers 11 and 12, which are guided in the loop-shaped member 9, will suddenly bend relative to each other toward the other end position because of the action of spring 13. During this sudden movement, valve member 15 will likewise be suddenly shifted to its other end position since pin 16 thereon will be taken along by the lower end of the slotted portion 14 of lever 12, as seen in FIGURE 2. Valve member 15 and lever 12 will then be in the other end position in engagement with the upper stop pin 20, in which position valve member 15 will be relieved from the pressure of levers 11 and 12, as already explained above.

As soon as the position of valve member 15 is thus reversed, the liquid to be measured will be discharged from the chamber 4 through by-pass 34, the elongated recess 28 in member 15 and channel 33, while it will flow into chamber 5 through channels 34 and 32 and bore 27 in member 15.

At every stroke of diaphragm 3, one of pawls 41 and 42 will be actuated through arm 38 and bracket 39, and will thereby rotate ratchet wheel 43 to a certain extent. Consequently, the counter mechanism will always advance to indicate the quantity of liquid which passes through measuring chambers 4 and 5. Since the proper operation of the apparatus is not dependent upon the volume or pressure of the flow of liquid, even very small quantities thereof will thus be accurately registered. Levers 10, 13 and 38, 39 are preferably mounted so as always to form a parallelogram.

It is a particular advantage of the new apparatus that the entire control mechanism is disposed within one measuring chamber of the apparatus, and that it may be assembled and accurately adjusted outside of the housing, and be inserted into the housing as a complete unit. After such unit has been inserted into housing part 2, it may be secured thereto by bolts which are screwed from below into the threaded holes 18 and 19 in valve plate 17.

Figure 7:
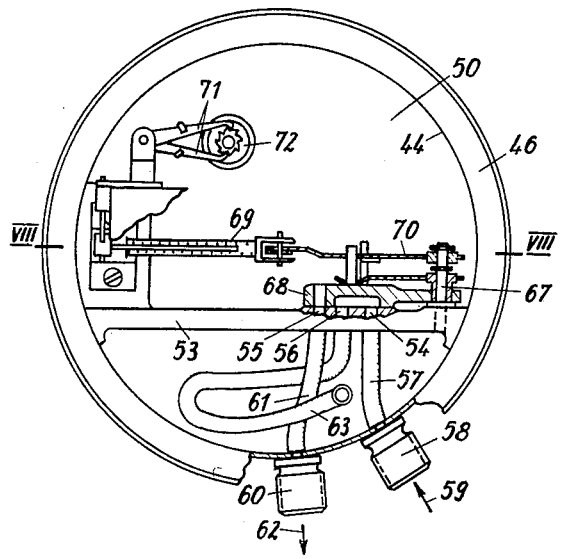
FIGURE 7 shows a front view of a modification of the invention illustrating a measuring chamber with a housing consisting of sheet metal and with the control mechanism therein.
Figure 8:
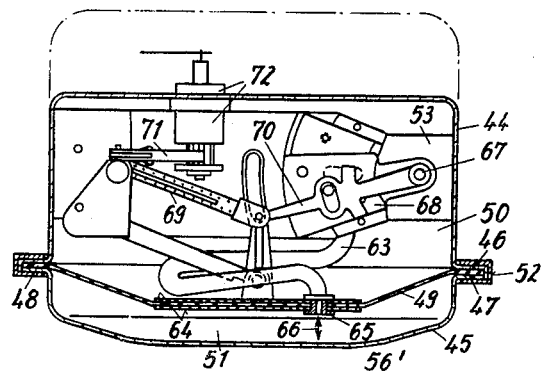
FIGURE 8 shows a cross section taken along line VIII—VIII of FIGURE 7.

The fuel consumption meter according to the modification of the invention as illustrated in FIGURES 7 and 8 essentially consists of the parts 44 and 45 which may be pressed out of sheet metal, and each of which is provided with a flange 46 or 47, respectively. These flanges are designed to secure the reinforced edge portion 48 of diaphragm 49 which separates the area enclosed by the sheet-metal parts 44 and 45 into the measuring chambers 50 and 51 which are thus sealed tightly relative to each other. A clamping ring 52 which surrounds flanges 47 and 46 and secures them to each other then also clamps diaphragm 49 in a fixed position and seals the entire inside of the meter toward the outside.

At the inside of measuring chamber 50 the supporting valve plate 53 is mounted on the housing part 44, for example, by being spot-welded thereto. Valve plate 53 is provided with bores 54, 55, and 56. Bore 54 is connected to a nozzle or the like, not shown, upon which a hose 57 of a plastic material is fitted. Hose 57 leads to a similar nozzle or the like on a pipe socket 58 which is secured to the wall of housing part 44, for example, by being welded thereto, and to which an inlet pipe may be connected for supplying the liquid to be measured, for example, fuel oil, to the inside of the meter in the direction as shown by the arrow 59. Bore 55 is connected in a similar manner to a socket 60 by means of a plastic hose 61. This socket may then be connected to a pipe for discharging the fuel oil from the meter in the direction as shown by the arrow 62. The two pipe sockets 58 and 60 may also extend symmetrically to a vertical central plane of the housing.

Finally, another plastic hose 63 is fitted over a nozzle which is connected to bore 56 and leads to diaphragm 49. The central part of diaphragm 49 which is reinforced by circular plates 64 has an aperture in which a socket 65 is mounted which may be connected to hose 63. The connection which is thus formed from bore 56 through hose 63 to measuring chamber 51 will serve as an inlet of the fuel oil into chamber 51 as well as an outlet therefrom in the direction as shown by the arrow 60. The plastic hose 63 preferably forms a large loop so as not to obstruct the movement of diaphragm 49.

Above valve plate 53, the pivotable valve member 68 is mounted on a shaft 67 so that one or the other of its bores and elongated recesses will coincide with bores 54, 55, and 56 in valve plate 53 in the same manner as previously described with reference to FIGURES 1 to 6 so as to allow the fuel oil to pass alternately into one measuring chamber or the other, and to regulate the flow from these chambers to occur alternately from one or the other. For this purpose, the lever system 69 which is connected to diaphragm 49 and which is designed in the shape of a parallelogram, is connected to valve member 68 by means of lever 70. The sudden movements of valve member 68 and levers 69 and 70 are transmitted by pawls 71 to the counter mechanism 72 which is mounted on the wall of the sheet-metal housing part 44 and extends through this wall to the outside of measuring chamber 50.

Figure 9:
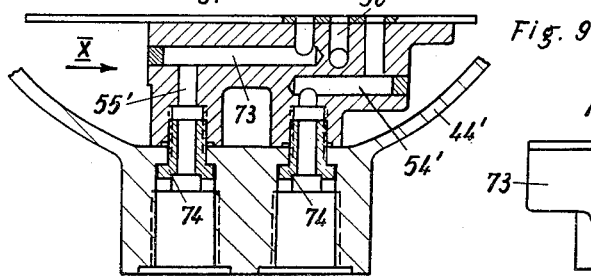
FIGURE 9 shows a cross section taken through a part of a housing with a channel block which is secured by means of hollow screws.
Figure 10:
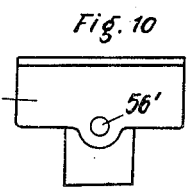
FIGURE 10 shows a side view of the channel block as seen in the direction of the arrow X in FIGURE 9.

In the modified embodiment of the invention as illustrated in FIGURE 9, the housing part 44' contains a separate element 73 which contains bores 54', 55', and 56' and is secured to housing part 44' by means of hollow screws 74 which are screwed into bores 54' and 55', respectively, and form the inlet or outlet of the liquid to be measured. As indicated particularly in FIGURE 10, bore 56' leads laterally out of the channel element 73 and is connected to a flexible conduit which, in turn, extends in a loop and is connected to the diaphragm in a similar manner as shown in FIGURE 8. Such a channel element 73 may be applied either to a sheet-metal housing or a cast housing.

Figure 11:
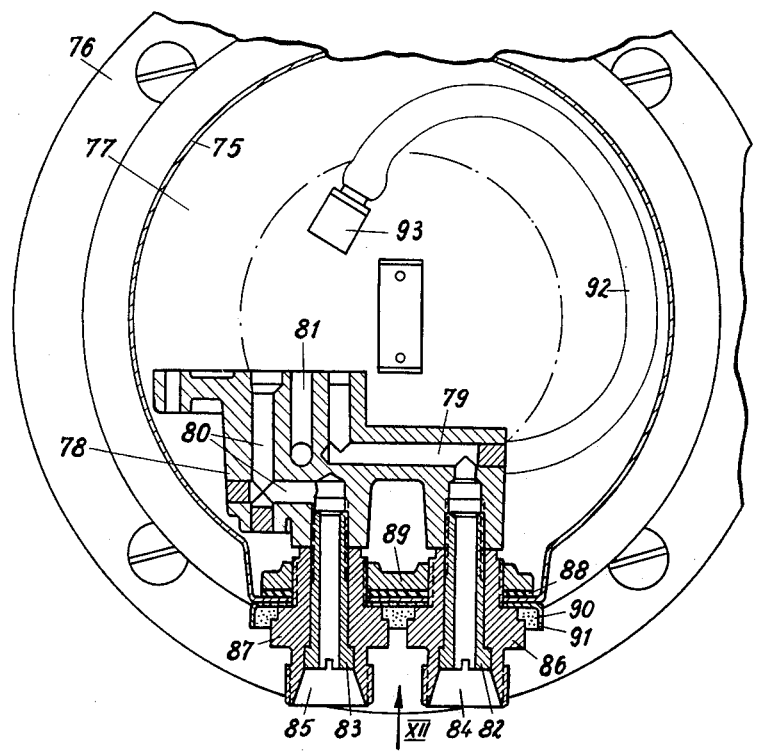
FIGURE 11 shows a cross section of another modification of the invention taken through an instrument housing with a channel block therein which is secured by means of hollow screws fitted into the connecting socket.
Figure 12:
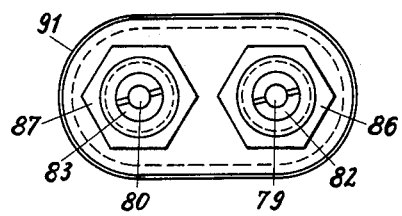
FIGURE 12 shows a view taken in the direction of the arrow XII in FIGURE 11.

In the modified embodiment of the invention, as illustrated in FIGURES 11 and 12, the pot-shaped housing part 75 may consist of thin sheet steel and is provided with a flange 76. The diaphragm 77 which separates the entire housing into two separate measuring chambers is clamped between flange 76 and a corresponding flange of the other housing part, not shown. Also in this embodiment, a separate channel element 78 which may be cast in one block is mounted within housing part 75 and contains the inlet channel 79, the outlet channel 80, and a further channel 81. Channel element 78 is secured to housing part 75 by means of hollow screws 82 and 83 which are screwed into channels 79 and 80, respectively, and are fitted from the outside of the housing into the central bores 84 and 85 in connecting sockets 86 and 87, respectively. These connecting sockets 86 and 87 are, in turn, screwed into the projecting portion 89 of housing part 75 and are tightly sealed therein by means of a suitable gasket 88. Toward the outside of housing part 75 connecting sockets 86 and 87 may be additionally sealed by means of a sealing compound 90 which is cast into the cup-shaped container 91 which surrounds the sockets.

The liquid to be measured flows through the channel element 78 and then to the control mechanism of the consumption meter by entering through bore 84 of socket 86 and by then passing through the hollow screw 82, and channel 79. The liquid after being measured is discharged from the instrument through channel 80 in channel element 78, and through the hollow screw 83 and bore 85 in socket 87. Channel 81 serves to conduct the liquid through the flexible hose 92 and the socket 93, which is mounted on and extends through diaphragm 77, to the other measuring chamber at the other side of diaphragm 77, so that the liquid may then leave the latter chamber through channel 79.

Figure 13:
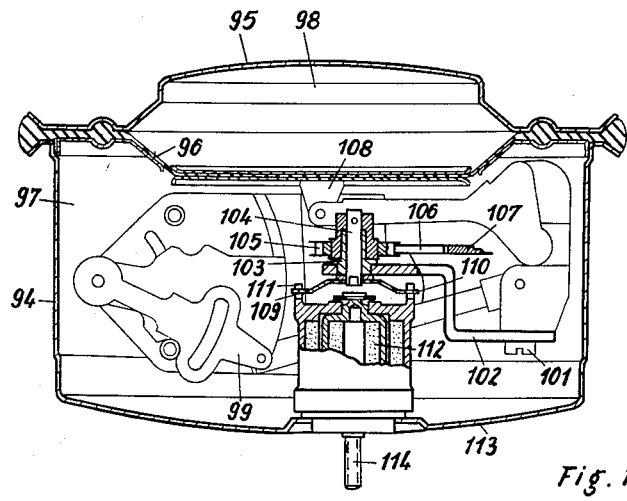
Figure 14:
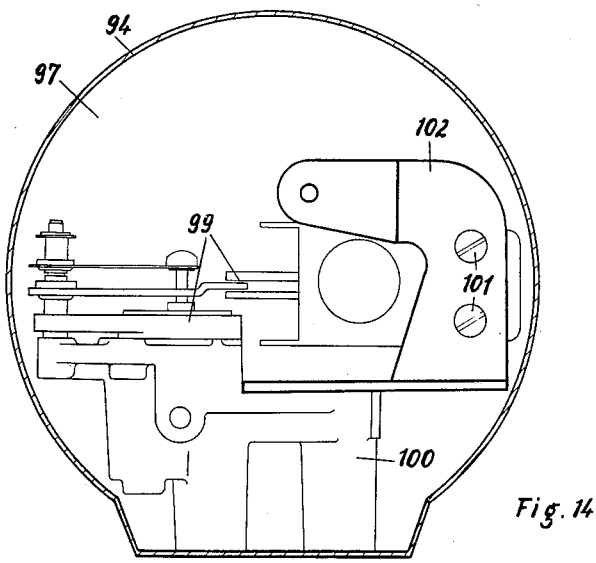
FIGURE 14 shows a vertical cross section of the instrument shown in FIGURE 13.

The mesuring instrument as illustrated in FIGURES 13 and 14 essentially consists of the two housing parts 94 and 95 which are stamped out of sheet metal and provided with flanges by means of which the diaphragm 96 is firmly clamped. This diaphragm separates the measuring chamber 97 in housing part 94 from measuring chamber 98 in housing part 95. Within measuring chamber 97, the measuring mechanism 99 is mounted on a separate insert 100 which contains the inlet and outlet channels which are connected to the inlet and outlet conduits at the point where the insert is secured to housing part 94. A bracket 102 of sheet metal is secured by screws 101 to the measuring insert 100 and carries on its free end a bearing 103 which rotatably supports a shaft 104. This shaft 104 carries secured thereto a ratchet wheel 105, the teeth of which are engaged by the two pawls 106 and 107. The reciprocating movements which are transmitted by diaphragm 96 through bracket 108 to the measuring mechanism 99 are further transmitted by the latter to pawls 106 and 107 which are rotatably mounted on the same axis and operate as pushing and pulling pawls to advance the ratchet wheel 105 in a stepwise movement. Shaft 104 further carries a disk 109 which is secured thereto and thus also to ratchet wheel 105, and has arms 110 which engage in the axial direction of shaft 104 into recesses 111 in one end of a magnetic clutch 112 and thus form a positive connection thereto. This magnetic clutch 112 is mounted on the wall 113 of housing part 94 and is adapted to drive a shaft 114 to which at the outside of the measuring instrument a suitable counting mechanism, not shown, may be connected which, if desired, may be mounted on wall 113.

When assembling the measuring instrument, the entire measuring mechanism 99, including ratchet wheel 105 by means of bracket 102, is secured to the insert 100. It is thus possible to assemble the individual parts of the measuring mechanism outside of the housing, and also to adjust the movable parts of the mechanism and to check whether they function properly before the entire mechanism is inserted into the housing. Particularly it is thus easily possible to adjust pawls 106 and 107 so as to engage accurately with ratchet wheel 105, inasmuch as these pawls have to have adequate play in order to carry out a movement reverse to the direction of rotation of ratchet wheel 105 so as to engage properly with the next tooth, and also to take the ratchet wheel properly along during their forward movement.

After the proper function of the measuring mechanism has been checked outside of the housing, arms 110 on disk 109 may be connected without difficulty to the magnetic clutch 112 by simply sliding the entire measuring insert 100 in the axial direction of shaft 114 and by then securing it to housing part 94.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An instrument for measuring the consumption of flowing liquids, especially fuel oil or other liquid fuels, by means of a volumetric measuring mechanism comprising a housing, a diaphragm separating said housing into a first and a second chamber, means conveying liquid into and from said housing and said chambers, said diaphragm being actuated by the pressure of the liquid to be measured within said chambers, a slide valve disposed within one of said chambers, said slide valve being so constructed and arranged as to control the inflow and outflow of the liquid through said conveying means to and from said chambers, control means for said valve so constructed and arranged as to alternately reverse the flow of liquid into and from said chambers upon reciprocation of said diaphragm, said control means comprising lever means so constructed and arranged as to carry out adjustment of said slide valve very suddenly, and including a first and second lever, the outer ends of which are each pivotable about a separate axis and the inner ends of which are pivotable about a common axis, and a loop-shaped guide member forming a drag link, the common connection of said levers being guided within said guide member, said guide member being operatively connected to said diaphragm for movement thereby, and counting means operatively connected with said diaphragm to record the movements thereof and thereby the consumption of the liquid.

2. An instrument as defined in claim 1, wherein said slide valve is provided with two bores and two elongated grooves, said slide valve being so constructed and arranged as to control the inflow and outflow of the liquid to and from the two chambers which are separated by the diaphragm by means of said bores and grooves in combination with said conveying means.

3. An instrument as defined in claim 2, further including means for pivotally mounting said slide valve, and a spring-loaded lever pivotable about an axis and acting upon said slide valve.

4. An instrument as defined in claim 3, further including stop means for limiting the pivotal movements of the slide valve in each direction.

5. An instrument as defined in claim 4, wherein the means in said slide valve used for pivotally mounting the same is a rounded bore.

6. An instrument as defined in claim 1, wherein said first lever consists of two coaxial rods which are telescopically slidable within each other, and wherein said second lever is connected to the slide valve by means of a drag link consisting of an elongated slot in said second lever and a pin mounted on said slide valve and engaging into said elongated slot.

7. An instrument as defined in claim 6, wherein said slide valve and said second lever are pivotable about a common axis, and further including a valve member associated with said slide valve and mounted on said shaft, and a leaf spring adapted to act upon said slide valve and to press the same upon the associated valve member.

8. An instrument as defined in claim 7, further including stop means limiting the pivotal movements of said second lever in both directions, said stop means being so constructed and arranged that, when said lever and slide valve are in one or the other of their end positions, said slide valve will be relieved of the load acting on the lever means.

9. An instrument as defined in claim 8, wherein said stop means includes two pins which simultaneously serve as stops for the slide valve and for the second lever, said pins being secured to said valve member, and wherein one of said slide valves and said second lever are so constructed and arranged that said second lever will reach said stop means a short period of time prior to said slide valve.

10. An instrument as defined in claim 1, further including a valve plate associated with the slide valve and forming a base for said instrument, said instrument being mounted within one of said chambers.

11. An instrument as defined in claim 1, further including means for mounting said control means within one of said measuring chambers, and wherein said conveying means includes a conduit connecting the control means to the other of said measuring chambers, said conduit conducting the inflow and outflow of the liquid to be measured to and from said other chamber and extending through the diaphragm, and consisting of a flexible material.

12. An instrument as defined in claim 1, wherein the conveying means includes an inflow channel and an outflow channel for conveying liquid to or from the chambers separated by said diaphragm, said inflow and outflow channels being disposed within a single element constructed as a separate channel block, said channel block being mounted within said housing and consisting of sheet metal, said channel block being secured to said housing from the outside thereof.

13. An instrument as defined in claim 1, wherein said counting means includes a ratchet wheel and pawls, and means for operatively connecting said pawls to said diaphragm.

14. An instrument as defined in claim 13, further including a bracket for supporting said ratchet wheel, said bracket being mounted on said housing, and a bearing secured to said bracket for supporting the shaft to said ratchet wheel.

15. An instrument as defined in claim 14, wherein the shaft of said ratchet wheel has secured thereto a disk member including arms, said instrument further including an electromagnetic clutch having a corresponding member, said arms being adapted to engage into said corresponding member and said electromagnetic clutch being connected to said counting means.

16. An instrument as defined in claim 12, wherein the means for securing the block-shaped channel element consist of hollow screws.

17. An instrument as defined in claim 16, wherein the hollow screws are mounted within sockets secured to the meter housing for connecting the inlet and outlet conduits thereto.

18. An instrument as defined in claim 17, wherein the connecting sockets are screwed into a supporting member disposed within the meter housing between the channel element and the wall of the housing.

References Cited in the file of this patent

UNITED STATES PATENTS 196,958    Weir _____ Nov. 6, 1877

FOREIGN PATENTS 214,933    Switzerland _____ Aug. 16, 1941